Feb. 12, 1957   B. W. SCHUFF   2,781,465
ROTOR FOR ELECTRIC MOTOR
Filed March 15, 1955

WITNESSES
Edwin E. Bassler
J E Bieber

INVENTOR
Bernard W. Schuff
BY
Arthur T. Stratton
ATTORNEY

United States Patent Office 2,781,465
Patented Feb. 12, 1957

2,781,465
ROTOR FOR ELECTRIC MOTOR

Bernard W. Schuff, Wilkinsburg, Pa., assignor to Westinghouse Electric Corporation, East Pittsburgh, Pa., a corporation of Pennsylvania Application March 15, 1955, Serial No. 494,310

11 Claims. (Cl. 310—211)

My invention relates to rotors for dynamoelectric machines, and more particularly to the construction of rotors having a solid metal rotor core.

In one type of electric motor adapted for operating pumps which are designed to pump fluids at extremely high temperature and pressure, it is customary to design the motor unit with separate stator and rotor compartments and allow fluid communication between the rotor compartment and the pump unit. Thus, the motor rotor will operate submerged in the fluid being pumped. Such a construction eliminates the need for a shaft seal between the motor unit and pump unit, which is the principal element that requires maintenance in such motor pump units and thus greatly increases the reliability of the motor pump unit. In order for such motor pump units to operate satisfactorily, it is necessary to encase the motor rotor in a thin-walled, corrosion-resistant, non-magnetic metal tube, so that the fluid being pumped is isolated from the rotor conductor bars and the rotor core in order to prevent corrosion of these parts. The customary construction of rotors is not desirable when constructing a rotor that is to be enclosed within a thin-walled, corrosion-resistant metal tube, since the laminations and slot wedges used to hold the conductor bars in the rotor slots do not present a uniform surface upon which the tube can be placed. Thus, the tube will be deformed by the extremely high pressure to conform to the uneven surface of the rotor and may fail.

One solution to this problem is to use a rotor core comprised of a solid piece of metal which will provide a uniform surface upon which the tube can be placed. The use of a solid core poses a problem, however, in providing suitable rotor conductor bar slots, especially when the slot design is of the semi-closed type. In this type of slot, the throat or slot opening is made smaller than the width of the slot in order to retain the rotor conductor bars in place when the rotor rotates, and centrifugal force tends to force the rotor conductor bars radially outward. One solution is to end mill the rotor slots to the desired shape and slide the rotor conductor bars into place from each end of the rotor. Also, when a semi-closed slot is used some provision must be made to close the opening at the top of the slot in order that the outer surface of the rotor core is uniform and free of depressions. This solution results in a satisfactory rotor, but its cost is high due to the difficulty of machining rotor slots having small throat openings and an undercut design.

I have solved the problem of using a rotor core comprised of a solid piece of metal by forming the rotor slots so that they have parallel sides, and a top opening with the same dimension as the bottom of the rotor slot. In order to retain the rotor conductor bars in such a slot, I form a slot having parallel sides and then deform the top edges of the rotor slot over the top of the rotor conductor bars, thus forming a substantially closed slot. Such a rotor slot is very easily machined since the opening on the outer surface of the rotor core is the same dimension as the bottom of the slot. My slot design can be easily formed by using a circular milling cutter and does not require the use of an end milling process as did the former slot design.

Accordingly, the principal object of my invention is to provide a rotor for a dynamoelectric machine having a solid core and a novel means for retaining the rotor conductor bars in the slots in the rotor core.

Another object of my invention is to provide a rotor for a dynamoelectric machine having a unique method of construction which produces a smooth, uniform outer surface on the rotor core over which a thin-walled metal tube can be placed.

Another object of my invention is to provide a novel method of construction for the rotor of a dynamoelectric machine that is economical to produce, and results in a rotor having increased dependability.

These and other objects and advantages of my invention may be more easily understood from the following detailed description of one embodiment of my invention, when taken in conjunction with the attached drawing, in which.

Figure 1:
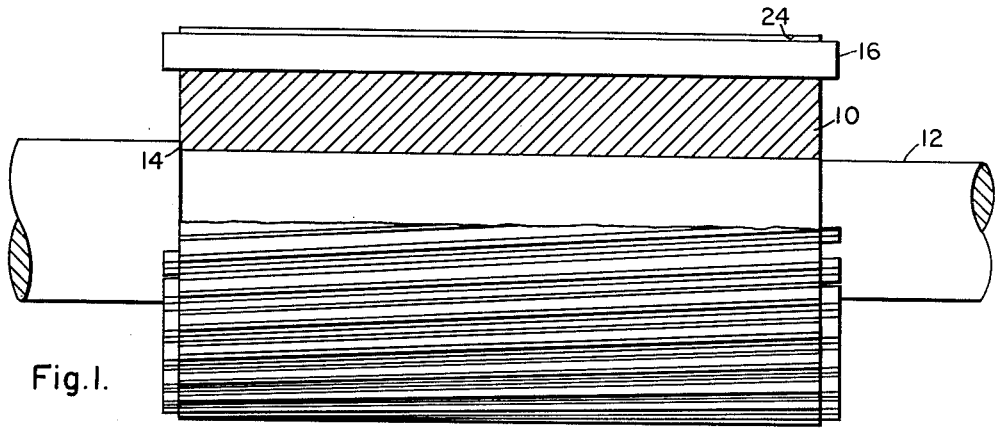
Figure 1 is an elevation view, shown partly in section of a partially completed rotor construction according to my invention.
Figure 2:
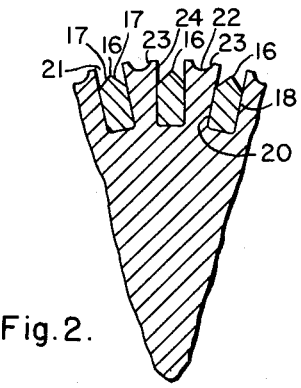
Fig. 2 is part of a transverse section of the rotor shown in Fig. 1 showing the rotor slots with the rotor conductor bars installed.

Fig. 1 shows a partially completed rotor embodying my invention in which a solid rotor core 10 has a central opening therethrough so as to be mounted on a rotor shaft 12, so that one end of the rotor core 10 rests against a shoulder 14 formed on one end of the rotor shaft 12. The rotor core 10 is preferably of the magnetic material, such as magnetic iron, and may be attached to the rotor shaft 12 by any suitable means, such as by a shrink fit. The rotor shaft 12 may be constructed of any suitable material, preferably a corrosion-resistant metal that is not affected by the fluid in which the rotor is to be submerged, such as stainless steel. A plurality of circumferentially spaced rotor conductor bar slots 24, as shown in Fig. 2, are formed in the outer surface of the rotor core 10, and rotor conductor bars 16, preferably of good electrically conducting material, such as copper, are placed in each of the slots. The rotor slots 24, as initially formed (Fig. 2), have parallel side walls 18 and 20 and a top opening 21 through which the rotor conductor bars 16 may be inserted. In addition, the rotor slots 24 may be slightly skewed, as shown in Fig. 1, to increase the electrical performance of the rotor, as is well known in the motor field. A groove 22, which may have an arcuate cross section, is also formed on the outer surface of the rotor core 10 between each of the adjacent openings 21 of the rotor slots 24.

Figure 3:
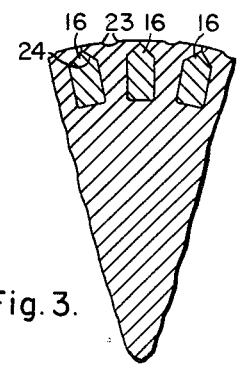
Fig. 3 is part of a transverse section of the rotor shown in Fig. 1 showing the sides of the rotor slots deformed over the top of the rotor conductor bars.

After the rotor conductor bars 16 have been installed in the rotor slots 24, the edges 23 at each side of each groove 22 are deformed by any suitable means, such as by swaging towards each other until they completely cover the top of the rotor conductor bars 16, as shown in Fig. 3. I prefer to use rotor conductor bars 16 having an outer surface formed by two converging surfaces 17 as the general wedge shape of this outer surface greatly simplifies the swaging of the edges over the conductor bars. The deforming of the edges 23 may be performed by any suitable means, such as using an air hammer, and a suitable blunt nosed tool to swage the metal of the rotor core 10 over the top of the conductor bars 16.

It can thus be seen that I have provided rotor slots 24 in a solid rotor core 10 which can easily be formed by well known machine methods, such as milling. The slots 24 are considerably simpler to form than the forming of the semi-closed slot, as described above. In order to form a semi-closed slot, it would be necessary to have a small top opening in the slot and then end mill the slots for the complete length of the rotor core 10. Such a procedure would be extremely costly since the end milling cutter would have to have a very small diameter where it passes through the top opening of the slot and the speed at which such a milling cutter could be advanced would be very slow. The slot 24 of my invention can be very easily formed by a circular milling cutter and the speed at which the cutter can be advanced is practically unlimited, depending upon the capacity of the machine used and the material used to form the milling cutter. In addition, when the edges 23 are deformed over the top of the rotor conductor bars 16, they substantially close the top of the rotor slot, thus forming a much stronger construction than if the top of the rotor slot had a small opening, as is the case with semi-closed slots.

Figure 4:
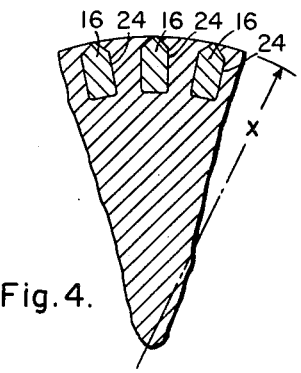
Fig. 4 is part of a transverse section of the rotor shown in Fig. 1 showing the rotor after its outer diameter has been turned to form a uniform surface.
Figure 5:
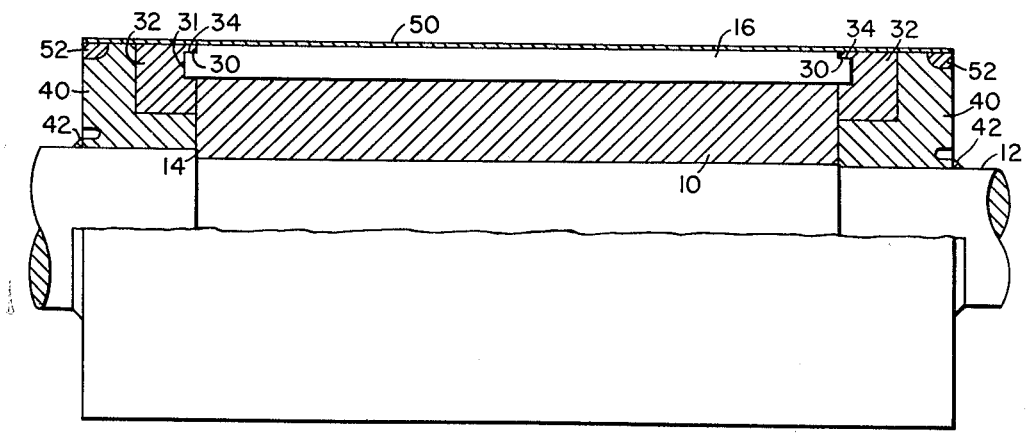
Fig. 5 is an elevation view, shown partly in section of a completed rotor constructed according to my invention.

After the edges 23 have been deformed over the top of the conductor bars 16, the ends of the bars 16 are trimmed to the desired length and a small notch 30 is formed in the outer surface of each bar 16 at each end of the bar, as shown in Fig. 5. A suitable shorting ring 32 is then placed over the ends of all of the conductor bars 16. The shorting rings 32 are of an electrical conducting material, such as copper, and have a suitable annular groove 31 formed in one surface which exactly fits the ends of the conductor bars 16 as shown in Fig. 5. The shorting rings may be attached to the conductor bars 16 by any desired means, such as inductive brazing of the two members together. After the shorting rings 32 are installed, suitable end plates 40 are installed at each end of the rotor core. The end plates 40 are preferably of a corrosion-resistant material, such as stainless steel, and are attached to the rotor shaft 12 by annular welds 42. After the end plates 40 have been attached to the rotor shaft 12, the outer surface of the rotor is turned to a finished diameter X, as shown in Fig. 4. In turning the rotor to a finished diameter X, a smooth, uniform surface, free of any of any depressions, is formed on the outer surface of the rotor. The finished diameter X may substantially correspond to the diametrical distance between the outer edge of one rotor bar 16 and the outer edge of the rotor bar 16 on the opposite side of the rotor.

A thin-walled metal tube 50 may then be easily placed over the outer surface of the rotor, as shown in Fig. 5. The thin-walled metal tube 50 is preferably of a corrosion-resistant metal, such as stainless steel and may be sealed to the end plates 40 by any desired means, such as small annular welds 52.

It can thus be seen that I have provided a rotor construction wherein the rotor core and the rotor conductor bars are completely enclosed by a corrosion-resistant metal, such as stainless steel, without reducing the electrical efficiency of the rotor. The thin-walled metal tube 50 used to seal the outer surface of my rotor will not be deformed over the top of the rotor slots as is customary where a semi-closed slot arrangement is used, since the rotor core substantially covers the entire top of the rotor slots. This feature allows the use of a very thin-walled tube 50 which will greatly increase the electrical efficiency of my rotor over rotors constructed in accordance with prior teachings, which require a substantially heavy tube in order to provide sufficient strength where it bridges the rotor slots.

While I have described my invention as embodied in a rotor designed to operate while submerged in a fluid from an external source, it is, of course, adaptable to any rotor or stator used in dynamoelectric machines. By deforming the rotor core over the top of the rotor slots to retain the conductor bars in place against centrifugal force, I have eliminated the need for the customary semi-closed slot and wedges used in most rotor constructions for retaining the conductor bars in place. In cases where the rotor would not be operating in a corrosive fluid, the thin-walled metal tube could be eliminated, and my construction would still be desirable.

Thus, it is desired that my invention be not limited to the specific construction shown and described herein for illustrative purposes because it will be apparent to those skilled in this art that my invention may be embodied in a number of different forms.

I claim as my invention:

1. A rotor for a dynamoelectric machine comprising, a solid metal core mounted on a rotor shaft, said core having a plurality of circumferentially spaced longitudinal slots formed on the outer surface thereof, each of said slots having flat parallel opposite side walls so that a conductor bar can be inserted radially of the rotor through the mouth of each slot, a conductor bar positioned in each of said longitudinal slots and extending beyond the ends of said rotor core, said conductor bars retained in said slots by having integral portions of said core at the outer edges of said slots swaged towards each other to substantially close said slots, each end of each of said conductor bars being attached to separate shorting rings, end plates mounted on said rotor shaft adjacent each end of said core and hermetically sealed thereto, a thin walled metal tube positioned over the outer surface of said core so as to enclose said conductor bars, shorting rings and end plates, said tube being hermetically sealed at each end to the adjacent end plate.

2. A rotor for a dynamoelectric machine comprising, a solid rotor core mounted on a rotor shaft, said core having a plurality of circumferentially spaced longitudinal slots formed on the outer surface thereof, each of said slots having flat parallel opposite side walls so that a conductor bar can be inserted radially of the rotor through the mouth of each slot, a conductor bar positioned in each of said slots, said conductor bars being of such a shape so as to closely fit the bottom of said slots and of a size to terminate short of the top of said slots, the ends of said conductor bars at one end of said core being connected to a common conductor, the opposite ends of said conductor bars being connected to a second common conductor, said conductor bars retained in said slots by having integral portions of said core at the outer edges of said slots swaged towards each other to substantially close said slots.

3. The method of constructing rotors for dynamoelectric machines comprising, forming a plurality of circumferentially spaced longitudinal slots having parallel side walls in the outer surface of a solid rotor core which is mounted on a rotor shaft so that a conductor bar can be inserted radially of the rotor through the mouth of each slot, placing a conductor bar in each of said slots, swaging only the portion of said rotor core extending radially outward beyond the top of said conductor bars inwardly to substantially close said slots, connecting all of the ends of said conductor at one end of said rotor core to a common conductor, connecting the opposite ends of said conductor bars to a second common conductor, attaching end plates to said rotor shaft adjacent each end of said rotor core, machining the outer surface of said end plates, common conductors and rotor core to uniform diameter substantially free of any depressions, placing a thin walled tube over said uniform diameter and sealing said thin walled tube to the adjacent end plates.

4. The method of retaining conductor bars in the slots of a solid rotor for a dynamoelectric machine comprising, forming a plurality of circumferentially spaced longitudinal slots having parallel side walls in the outer surface of the rotor core so that a conductor bar can be installed radially of the rotor through the mouth of each slot, placing conductor bars in said slots, said conductor bars terminating short of the top of said slots, swaging only the portion of said rotor core extending radially outward beyond the top of said conductor bars towards the center of said slots and over the top of said conductor bars until opposite sides of each slot substantially close the space on top of said conductor bars, then machining the rotor core to a uniform diameter substantially free of depressions corresponding to the distance between the outer surfaces of diametrically opposite conductor bars.

5. A rotor for a dynamoelectric machine comprising, a solid rotor core mounted on a rotor shaft, said core having a plurality of circumferentially spaced longitudinal slots formed on the outer surface thereof, each of said slots having flat parallel opposite side walls so that a conductor bar can be inserted radially of the rotor through the mouth of each slot, a conductor bar positioned in each of said slots, said conductor bars being of such a shape so as to closely fit the bottom of said slots and of a size to terminate short of the top of said slots, the ends of said conductor bars at one end of said core being connected to a common conductor, the opposite ends of said conductor bars being connected to a second common conductor, said conductor bars retained in said slots by having integral portions of said core at the outer edges of said slots swaged towards each other to substantially close said slots, and said rotor core having a smooth uniform outer diameter substantially free of depressions.

6. A rotor for a dynamoelectric machine comprising, a solid rotor core mounted on a rotor shaft, said core having a plurality of circumferentially spaced longitudinal slots formed on the outer surface thereof, each of said slots having flat parallel opposite side walls so that a conductor bar can be inserted radially of the rotor through the mouth of each slot, a conductor bar having wedge shaped outer surfaces positioned in each of said slots and terminating short of the top of said slots, the ends of said conductor bars at one end of said core being connected to a common conductor, the opposite ends of said conductor bars being connected to a second common conductor, said conductor bars retained in said slots by having integral portions of said core at the outer edges of said slots swaged towards each other to substantially close said slots, and said rotor core having a smooth uniform outer diameter substantially free of depressions.

7. The method of retaining conductor bars in the slots of a solid rotor for a dynamoelectric machine comprising, forming a plurality of circumferentially spaced longitudinal slots having parallel side walls in the outer surface of the rotor core so that a conductor bar can be inserted radially of the rotor through the mouth of each slot, placing conductor bars having wedge shaped outer surfaces in said slots, swaging portions of said rotor core extending radially beyond the top of said conductor bars towards the center of adjacent slots and over the top of said conductor bars to substantially close the space on top of said conductor bars, then machining the rotor core to a uniform diameter substantially free of depressions corresponding substantially to the distance between the outer surfaces of diametrically opposite conductor bars.

8. The method of retaining conductor bars in the slots of a solid rotor for a dynamoelectric machine comprising, forming a plurality of circumferentially spaced longitudinal slots having parallel side walls in the outer surface of the rotor core so that a conductor bar can be inserted radially of the rotor through the mouth of each slot, forming a groove in the teeth of the rotor core that extend radially outward between said longitudinal slots, said grooves having a depth not greater than the portion of said rotor teeth that extends beyond the outer surface of said conductor bars, placing said conductor bars having wedge shaped outer surfaces in said slots, swaging portions of each tooth of the rotor core which extend beyond the outer surface of said conductor bars from its groove towards the center of adjacent slots to substantially cover the outer surface of said conductor bars, then machining the outer surface of the rotor core to a uniform diameter corresponding substantially to the distance between the outer surfaces of diametrically opposite conductor bars free of substantially all depressions.

9. In a winding structure for a dynamoelectric machine, the combination comprising a base member having a plurality of spaced substantially parallel slots formed on a surface thereof, each of said slots having opposed side walls disposed so that an electrical conductor can be inserted normally of said surface through the mouth of each slot; a plurality of electrical conductors inserted individually into said slots, the cross-sectional shape of said conductors conforming substantially to that of said slots but having the top surfaces thereof terminating short of said mouths; and integral portions of said base member adjacent said mouths and outward of said conductors being swaged toward each other and against said top surfaces substantially to close said slots.

10. In a winding structure for a dynamoelectric machine, the combination comprising a base member having a plurality of spaced substantially parallel slots formed on a surface thereof, each of said slots having opposed side walls disposed so that an electrical conductor can be inserted normally of said surface through the mouth of each slot; a plurality of electrical conductors inserted individually into said slots, the cross-sectional shape of said conductors conforming substantially to that of said slots and having the top surfaces thereof terminating short of said mouths, respectively; integral portions of said base member adjacent said mouths and outward of said conductors being swaged toward each other and against said top surfaces substantially to close said slots; and said surface having a uniform contour extending substantially continuously over said top surfaces.

11. In a winding structure for a dynamoelectric machine, the combination comprising a base member having a plurality of spaced substantially parallel slots formed on a surface thereof, each of said slots having opposed side walls disposed so that an electrical conductor can be inserted normally of said surface through the mouth of each slot; a plurality of electrical conductors inserted individually into said slots, the cross-sectional shape of said conductors conforming substantially to that of said slots and having the height thereof terminating short of said mouths, said conductors further having the top surfaces thereof formed in a wedge-shaped configuration; and integral portions of said base member adjacent said mouths and outward of said conductors being swaged towards each other and against said top surfaces substantially to close said slots.

References Cited in the file of this patent

UNITED STATES PATENTS

| | | |
|---|---|---|
| 911,713 | Frankenfield | Feb. 9, 1909 |
| 1,592,939 | Kanaky | July 20, 1926 |
| 2,568,548 | Howard et al. | Sept. 18, 1951 |